United States Patent
Jantsch et al.

(10) Patent No.: US 6,800,392 B2
(45) Date of Patent: Oct. 5, 2004

(54) NIOBIUM ALLOY AND HYDROGEN PERMEATION MEMBRANE PRODUCED FROM IT

(75) Inventors: Uwe Jantsch, Freigericht (DE); Harald Manhardt, Bruchköbel (DE); David Francis Lupton, Gelnhausen (DE)

(73) Assignee: W. C. Heraeus GmbH & Co. KG (DE)

(*) Notice: Subject to any disclaimer, the term of this patent is extended or adjusted under 35 U.S.C. 154(b) by 196 days.

(21) Appl. No.: 09/992,952

(22) Filed: Nov. 5, 2001

(65) Prior Publication Data

US 2002/0058181 A1 May 16, 2002

(30) Foreign Application Priority Data

Nov. 16, 2000 (DE) ......................... 100 57 161

(51) Int. Cl.$^7$ ............................... H01M 8/06
(52) U.S. Cl. ........................... 429/44; 429/19
(58) Field of Search ............... 429/19, 44; 420/425, 420/426; 96/4; 423/248; 95/56

(56) References Cited

U.S. PATENT DOCUMENTS

| | | | |
|---|---|---|---|
| 3,350,846 A | * | 11/1967 | Makrides et al. ............ 95/56 |
| 3,365,276 A | | 1/1968 | Childs et al. |
| 4,496,373 A | * | 1/1985 | Behr et al. ............... 205/354 |
| 5,215,729 A | * | 6/1993 | Buxbaum .................. 423/248 |
| 6,183,543 B1 | * | 2/2001 | Buxbuam .................... 96/11 |
| 6,267,801 B1 | | 7/2001 | Baake et al. |

FOREIGN PATENT DOCUMENTS

| | | | | |
|---|---|---|---|---|
| DE | 198 03 132 | | 4/1999 | |
| EP | 988 884 | | 3/2000 | |
| GB | 1292025 A | * | 10/1972 | ......... B01D/53/22 |

OTHER PUBLICATIONS

ASM Handbook On–line, vols. 3 and 4, copyright 2003; hard copy published 1990. http://www.asminternational.org/hbk/index.js.*

* cited by examiner

Primary Examiner—Carol Chaney
(74) Attorney, Agent, or Firm—Ostrolenk, Faber, Gerb & Soffen, LLP

(57) ABSTRACT

A hydrogen permeation membrane including a niobium alloy with 5–25 wt. % of at least one element from the group consisting of palladium, ruthenium, rhenium, platinum, gold, and rhodium.

7 Claims, No Drawings

NIOBIUM ALLOY AND HYDROGEN PERMEATION MEMBRANE PRODUCED FROM IT

BACKGROUND OF THE INVENTION

The invention pertains to a hydrogen permeation membrane, to a process for the production of hydrogen permeation membranes, and to uses of these membranes.

Metallic membranes which can be used to separate hydrogen selectively from gas mixtures have been known for a long time. To achieve the highest possible hydrogen throughput, thin foils of metals which have high permeability to hydrogen must be used. The metals which can be considered for this purpose are those in which hydrogen has not only high solubility but also a sufficient diffusion capacity. Metals of this type include, for example, palladium and the metals of groups 4b and 5b (titanium, zirconium, hafnium, vanadium, tantalum, and niobium). When they absorb hydrogen, however, these metals become brittle, which makes them unusable for the selective separation of hydrogen.

In contrast, various palladium alloys (such as PdAg, PdCu, PdY) are resistant to hydrogen embrittlement and in some cases have a higher permeability to hydrogen than pure palladium does. For technical applications, palladium alloys, especially PdAg25, are used exclusively for this reason.

In comparison with palladium, however, the metals of groups 4b and 5b have much higher permeation rates, rates which can be one to two orders of magnitude higher. Niobium, for example, has been found to have the highest hydrogen permeability of all (see U.S. Pat. No. 3,350,846 and *Journal of Membrane Science*, Vol. 85, pp. 29–38, 1993).

In addition to the problem of hydrogen embrittlement, however, the high affinity of these metals for oxygen must also be taken into account, because it leads to the passivation of the surface through the formation of oxide layers. It is therefore also necessary to protect the surface with oxidation-resistant materials such as palladium, which are applied in the form of thin layers (<1 $\mu$m) to both sides of the foils. The permeation rate is also significantly affected by the thickness of these protective layers, however, which means that they should be applied as thinly as possible.

Attempts to suppress the hydrogen embrittlement of these metals by various alloying additions have been only partially successful so far. For example, U.S. Pat. No. 4,496,373 describes an alloy with the atomic composition $Ti_{0.5}Ta_{0.3}Cu_{0.1}V_{0.1}$, in which no hydrogen embrittlement occurs at hydrogen partial pressures of up to 1 bar at T=+300° C.

The disadvantage of the hydrogen permeation membranes which are known according to the state of the art and which are suitable for practical use is the fact that it is necessary to process large amounts of noble metals. Because noble metals are expensive, the technical applications must be limited to a handful of specialized areas.

SUMMARY AND DESCRIPTION OF THE INVENTION

What has been said above leads to the problem of providing novel hydrogen permeation membranes which are able to eliminate the disadvantages described above, at least in part, and of a corresponding process for producing them.

In particular, the problem is to provide an affordable noble metal-containing, hydrogen-permeable membrane which undergoes little or no embrittlement on one side and has the same high hydrogen permeation rates as that of the metals groups 4b and 5b on the other side.

This problem is solved according to the invention by means of a hydrogen permeation membrane comprising of a niobium alloy with 5–25 wt. % of at least one element from the group consisting of palladium, ruthenium, rhenium, platinum, gold, and rhodium.

The membrane according to the invention is surprising in that it has very little tendency to become brittle in a hydrogen atmosphere, whereas its hydrogen permeability is greater than that of the corresponding palladium alloys.

It is advantageous, first, for the hydrogen permeation membrane also to contain zirconium and/or hafnium, because these elements considerably reduce the danger of grain coarsening, which promotes the tendency toward embrittlement.

In addition, it has been found advantageous in practice for the membrane to consist of an alloy with 0.5–3.0 wt. % of zirconium and 10–20 wt. % of palladium.

In the process according to the invention for the production of hydrogen permeation membranes, especially for the production of those described above, at least one coating of at least one element from the group consisting of palladium, ruthenium, rhenium, platinum, gold, rhodium, zirconium, and hafnium is applied first to a substrate of niobium or of a niobium alloy with at least one element from the group consisting of palladium, ruthenium, rhenium, platinum, gold, and rhodium to form a composite. Then this composite is subjected to a diffusion heat treatment, so that the individual components diffuse into each other and thus are able to form an appropriate homogeneous alloy.

It has proven advantageous in practice to apply the coating by the PVD process, by chemical deposition, by electrodeposition, or by mechanical plating.

The use of hydrogen permeation membranes according to the invention or the use of hydrogen permeation membranes produced according to the invention as membranes in fuel cells has shown very positive results.

The following examples serve to explain the invention.

EXAMPLES

Actual Example 1

A 2-mm-thick sheet of niobium was plated on both sides with palladium foil with a thickness of 0.126 mm. Then the Pd/Nb/Pd composite sheet thus produced was reduced to a thickness of 50 $\mu$m by rolling it several times. Several foils produced in this way were annealed in a furnace at a temperature of 1,400° C. for 14 hours under vacuum. In the course of this process, a NbPd alloy was produced by the interdiffusion of the two metals in correspondence with the predetermined weight ratios of 85% niobium and 15% palladium. The analysis of the distribution of the elements over the thickness of the foil showed a homogeneous distribution of niobium and palladium over the entire thickness of the foil.

The foils thus produced were heated at ambient pressure under pure hydrogen to a temperature of 800° C. and held for 60 minutes at this temperature to eliminate any possible oxide layers which might hinder the absorption of hydrogen. The foils were cooled to 300° C. under the same atmosphere, then the test materials were left under these conditions for 30 minutes.

Several test pieces were then removed from the furnace and immediately brought to ambient temperature by quenching. The foils showed no cracks. The measurements conducted immediately thereafter to determine the hydrogen content showed that the hydrogen solubility of the NbPd alloy was about twice as high as that of a PdAg23 alloy.

The test materials remaining in the furnace were then slowly cooled under a hydrogen atmosphere and examined for cracks. The test pieces had no cracks.

Actual Example 2

A 50 μm-thick niobium foil was placed in a sputtering apparatus and coated on both sides with 1 μm of Pd. The palladium layers on both sides of the niobium foil were then reinforced by a 3.2-μm-thick electrodeposited layer of palladium. The test piece was then annealed under vacuum and aged under hydrogen.

The treatment under vacuum and the hydrogen aging were carried out in the same way as described in Actual Example 1.

After the treatment, the foil had no cracks. The solubility for hydrogen was about twice as high as that of PdAg23,.

Actual Example 3

Same as Actual Example 2, except that the foil consisted of the alloy NbZr1.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A hydrogen permeation membrane comprising: a niobium alloy with 5–25 wt. % of at least one element from the group consisting of ruthenium, rhenium, and rhodium.

2. A hydrogen permeation membrane according to claim 1, and further comprising at least one of zirconium and hafnium.

3. A hydrogen permeation membrane according to claim 1, wherein the alloy has 0.5–3.0 wt. % of zirconium.

4. A process for producing a hydrogen permeation membrane, comprising the steps of:

applying at least one coating of at least one element from the group consisting of palladium, ruthenium, rhenium, platinum, gold, rhodium, zirconium, and hafnium on a substrate of one of niobium and a niobium alloy with at least one element from the group consisting of palladium, ruthenium, rhenium, platinum, gold, and rhodium to form a composite; and subjecting the composite to a diffusion heat treatment.

5. A process according to claim 4, including applying the coating one of by the PVD process, by chemical deposition, by electrodeposition, and by mechanical plating.

6. A fuel cell comprising a hydrogen permeation membrane consisting of niobium alloy with 5–25 wt. % of at least one element from the group consisting of palladium, ruthenium, rhenium, platinum, gold, and rhodium.

7. A fuel cell having a hydrogen permeation membrane produced by:

applying at least one coating of at least one element from the group consisting of palladium, ruthenium, rhenium, platinum, gold, rhodium, zirconium, and hafnium on a substrate of one of niobium and a niobium alloy with at least one element from the group consisting of palladium, ruthenium, rhenium, platinum, gold, and rhodium to form a composite; and subjecting the composite to a diffusion heat treatment.

* * * * *